US011492978B2

(12) United States Patent
Lutjen et al.

(10) Patent No.: US 11,492,978 B2
(45) Date of Patent: Nov. 8, 2022

(54) SEAL ASSEMBLY WITH SECONDARY RETENTION FEATURE

(71) Applicant: RAYTHEON TECHNOLOGIES CORPORATION, Farmington, CT (US)

(72) Inventors: Paul M. Lutjen, Kennebunkport, ME (US); Carson A. Roy Thill, South Berwick, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 17/513,995

(22) Filed: Oct. 29, 2021

(65) Prior Publication Data

US 2022/0049659 A1     Feb. 17, 2022

Related U.S. Application Data

(62) Division of application No. 16/695,616, filed on Nov. 26, 2019, now Pat. No. 11,174,795.

(51) Int. Cl.
*F02C 7/28*     (2006.01)
(52) U.S. Cl.
CPC ............ *F02C 7/28* (2013.01); *F05D 2220/32* (2013.01); *F05D 2240/55* (2013.01); *F05D 2300/20* (2013.01)
(58) Field of Classification Search
CPC ........ F01D 11/005; F01D 11/12; F01D 21/08; F01D 25/246; F01D 11/025; F01D 11/18;
(Continued)

(56) References Cited

U.S. PATENT DOCUMENTS 4,650,394 A * 3/1987 Weidner ................ F01D 11/005
                                                         415/115
7,874,795 B2    1/2011 Burdgick et al.
(Continued)

FOREIGN PATENT DOCUMENTS

EP      3176381         6/2017
FR      3036435 A1 *    11/2016    .............. F01D 11/08

OTHER PUBLICATIONS

Partial European Search Report for European Patent Application No. 20208790.4 completed Aug. 19, 2021.

*Primary Examiner* — Jesse S Bogue
(74) *Attorney, Agent, or Firm* — Carlson, Gaskey & Olds, P.C.

(57)     ABSTRACT

An assembly for a gas turbine engine according to an example of the present disclosure includes, among other things, a gas turbine engine component that has a first interface portion, and a support that has a mounting portion and a second interface portion, the mounting portion attachable to an engine static structure, a first retention feature that releasably secures the first interface portion to the support in a first installed position of the gas turbine engine component, and a second retention feature dimensioned to secure the first interface portion to the second interface portion in a second installed position of the gas turbine engine component. The first installed position differs from the second installed position, and one of first and second retention features is dimensioned to carry the gas turbine engine component in response to release of another one of the first and second retention features. A method of sealing for a gas turbine engine is also disclosed.

20 Claims, 6 Drawing Sheets

(58) Field of Classification Search
CPC .. F02C 7/28; F05D 2220/32; F05D 2230/642; F05D 2240/11; F05D 2240/55; F05D 2250/11; F05D 2250/14; F05D 2250/23; F05D 2250/231; F05D 2300/20; F05D 2230/644; F05D 2300/6033
See application file for complete search history.

(56) References Cited

U.S. PATENT DOCUMENTS

| | | | |
|---|---|---|---|
| 8,439,636 B1 * | 5/2013 | Liang | F01D 11/08 |
| | | | 415/173.1 |
| 8,579,580 B2 | 11/2013 | Albers et al. | |
| 8,753,073 B2 | 6/2014 | Albers et al. | |
| 9,518,474 B2 | 12/2016 | Shapiro et al. | |
| 9,863,265 B2 | 1/2018 | Stapleton | |
| 9,874,104 B2 | 1/2018 | Shapiro | |
| 10,370,998 B2 | 8/2019 | Vetters et al. | |
| 10,385,718 B2 | 8/2019 | O'Leary et al. | |
| 2011/0052367 A1 * | 3/2011 | Martin | F01D 11/08 |
| | | | 415/209.3 |
| 2017/0016341 A1 | 1/2017 | Stapleton et al. | |
| 2018/0291769 A1 * | 10/2018 | Vetters | F01D 25/246 |
| 2018/0363506 A1 | 12/2018 | Tesson et al. | |
| 2018/0363507 A1 | 12/2018 | Roussille et al. | |
| 2020/0256215 A1 * | 8/2020 | Walston | F01D 25/246 |
| 2020/0400040 A1 * | 12/2020 | Kusumoto | F01D 25/005 |

* cited by examiner

SEAL ASSEMBLY WITH SECONDARY RETENTION FEATURE

CROSS-REFERENCE TO RELATED APPLICATION

This application is a divisional application of U.S. application Ser. No. 16/695,616 filed on Nov. 26, 2019.

BACKGROUND

This disclosure relates to positioning of components of a gas turbine engine.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes are positioned adjacent to the turbine blades to control the flow of the products of combustion.

The turbine section may include multiple stages of rotatable blades and static vanes. An annular shroud or blade outer air seal may be provided around the blades in close radial proximity to the tips of the blades to reduce the amount of gas flow that escapes around the blades. The shroud typically includes a plurality of arc segments that are circumferentially arranged about the blades.

SUMMARY

An assembly for a gas turbine engine according to an example of the present disclosure includes a gas turbine engine component that has a first interface portion, and a support that has a mounting portion and a second interface portion, the mounting portion attachable to an engine static structure, a first retention feature that releasably secures the first interface portion to the support in a first installed position of the gas turbine engine component, and a second retention feature dimensioned to secure the first interface portion to the second interface portion in a second installed position of the gas turbine engine component. The first installed position differs from the second installed position, and one of first and second retention features is dimensioned to carry the gas turbine engine component in response to release of another one of the first and second retention features.

In a further embodiment of any of the foregoing embodiments, the second retention feature includes an interface flange extending outwardly from the first interface portion and includes a support flange extending from the second interface portion. The interface flange is dimensioned to sit on the support flange in the second installed position.

In a further embodiment of any of the foregoing embodiments, the gas turbine engine component is a seal arc segment including a sealing portion dimensioned to bound a gas path surface. The first interface portion includes an interface bore. The first retention feature includes a retention pin slidably received in the interface bore to secure the first interface portion to the support in the first installed position of the seal arc segment, and the interface bore is dimensioned such that the seal arc segment sits on an outer periphery of the retention pin in the first installed position.

In a further embodiment of any of the foregoing embodiments, the second retention feature includes an interface flange extending outwardly from the first interface portion and includes a support flange extending from the second interface portion. The interface flange is dimensioned to sit on the support flange in the second installed position.

In a further embodiment of any of the foregoing embodiments, the second interface portion includes a support bore dimensioned to at least partially receive the retention pin to establish the first installed position of the seal arc segment.

In a further embodiment of any of the foregoing embodiments, the interface bore is dimensioned such that the seal arc segment sits on an outer periphery of the retention pin in the first installed position.

In a further embodiment of any of the foregoing embodiments, the interface flange of the seal arc segment comprises a ceramic material.

In a further embodiment of any of the foregoing embodiments, the interface flange includes a sacrificial member dimensioned to engage the support flange in the second installed position.

In a further embodiment of any of the foregoing embodiments, the gas turbine engine component is a seal arc segment including a sealing portion dimensioned to bound a gas path surface, and the sealing portion and the first interface portion of the seal arc segment comprise a ceramic material.

In a further embodiment of any of the foregoing embodiments, the gas turbine engine component is a seal arc segment including a sealing portion dimensioned to bound a gas path surface, and further including a seal plate attachable to the support, and a seal member captured between the seal arc segment and the seal plate. The first interface portion includes a first flange. The seal plate includes a plate flange, and the plate flange is dimensioned to carry the seal arc segment in the second installed position.

In a further embodiment of any of the foregoing embodiments, the first interface portion includes an interface bore. The first retention feature includes a retention pin slidably received in the interface bore to secure the first interface portion to the support in the first installed position of the seal arc segment, and the seal plate includes a plate bore dimensioned to at least partially receive the retention pin to establish the first installed position of the seal arc segment.

A gas turbine engine according to an example of the present disclosure includes an engine case extending along an engine longitudinal axis, an array of blades rotatable about the engine longitudinal axis, and a seal assembly including an array of blade outer air seals (BOAS) arranged about the array of blades. Each of the BOAS has a sealing portion and a first interface portion. The sealing portion is dimensioned to bound a core flow path, and the first interface portion including at least one interface bore. At least one support is attached to the engine case. A first retention feature has a plurality of retention pins dimensioned to engage the at least one support and the first interface portion of a respective one of the BOAS such that the BOAS are carried by the retention pins in a first installed position. A second retention feature is dimensioned to bound radial movement of the BOAS towards the engine longitudinal axis in a second installed position of the BOAS.

In a further embodiment of any of the foregoing embodiments, each of the BOAS comprises a ceramic material.

In a further embodiment of any of the foregoing embodiments, each of the retention pins is slidably received in a respective interface bore of the first interface portion and at least partially received in a respective support bore of the at least one support such that the first interface portion sits on a radially outer surface of the respective retention pin in the first installed position.

In a further embodiment of any of the foregoing embodiments, the seal assembly includes a seal plate releasably secured to the at least one support, and each of the retention pins is inserted into a respective plate bore of the seal plate to establish the first installed position.

In a further embodiment of any of the foregoing embodiments, a first retention hook of the first interface portion is dimensioned to sit on a second retention hook of the at least one support in the second installed position.

A method of sealing for a gas turbine engine according to an example of the present disclosure includes positioning a first interface portion of a seal arc segment relative to a second interface portion of a support such that engagement of the first and second interface portions establishes a first installed position of the seal arc segment in which the seal arc segment is carried by the support, and inserting a retention pin in an interface bore of the seal arc segment and a support bore of the support such that engagement of the retention pin with surfaces of the interface bore and surfaces of the support bore establishes a second installed position of the seal arc segment in which the seal arc segment is carried by the retention pin. One of the first and second installed positions is established in response to release of the seal arc segment from another one of the first and second installed positions subsequent to the positioning and inserting steps.

In a further embodiment of any of the foregoing embodiments, the seal arc segment comprises a ceramic material.

A further embodiment of any of the foregoing embodiments includes securing a seal plate to the support, and inserting the retention pin in a plate bore of the seal plate to establish the second installed position.

In a further embodiment of any of the foregoing embodiments, the first interface portion includes a first flange. The second interface portion includes a second flange, and the first flange is dimensioned to sit on the second flange in the first installed position.

The various features and advantages of this disclosure will become apparent to those skilled in the art from the following detailed description. The drawings that accompany the detailed description can be briefly described as follows.

DETAILED DESCRIPTION

Figure 1:
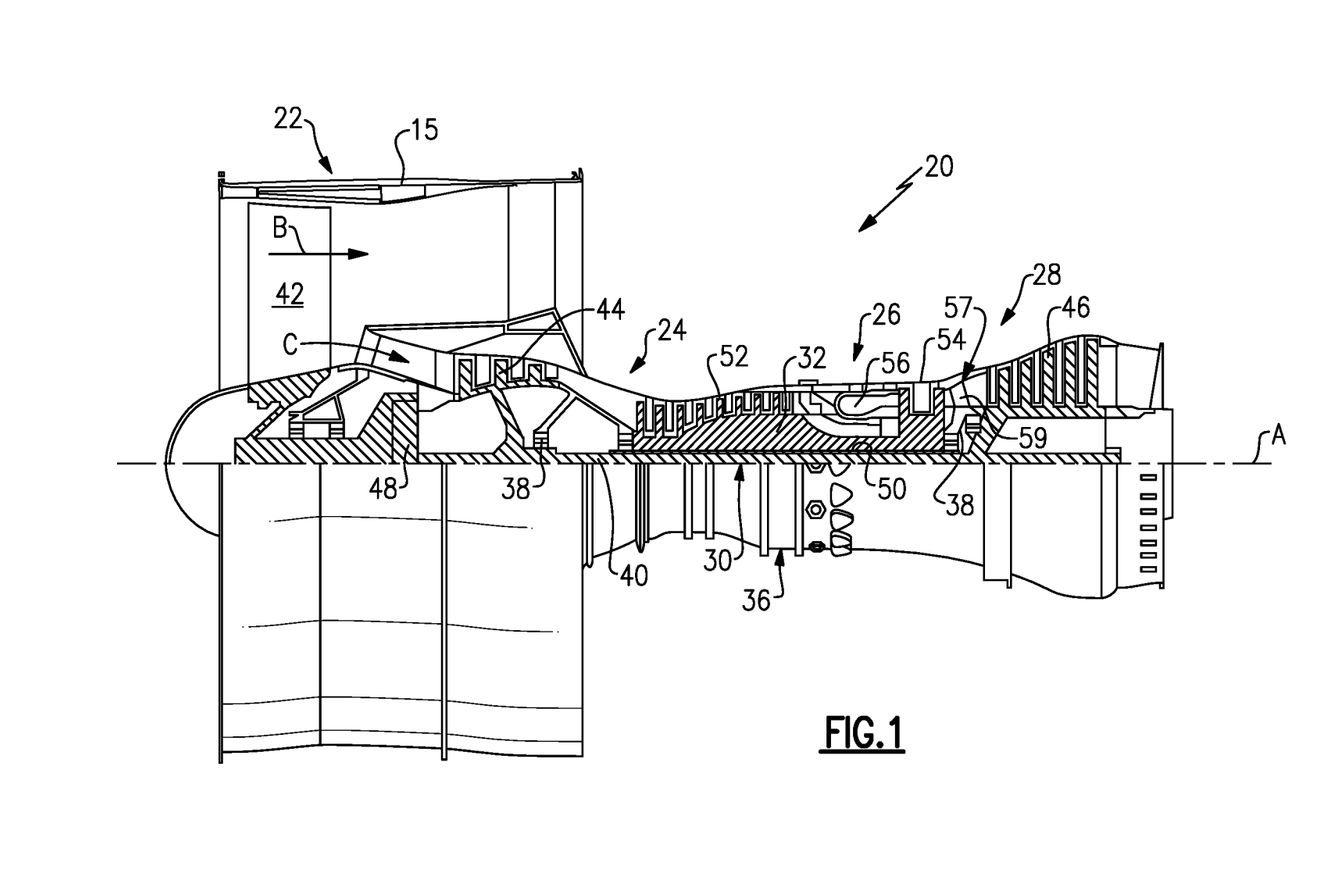
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"——is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

Figure 2:
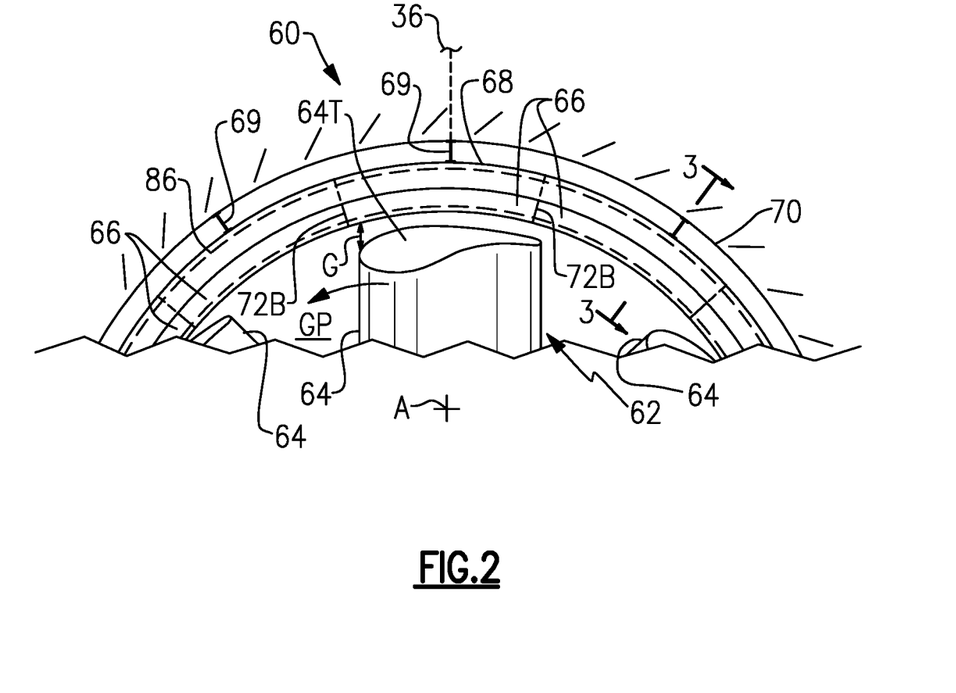
FIG. 2 illustrates an axial view of an example blade outer air seal assembly including a plurality of seal arc segments.

FIG. 2 illustrates an axial view of an example assembly 60 for a gas turbine engine. The assembly 60 can be incorporated into a portion of the engine 20 of FIG. 1, such as the turbine section 28. In the illustrative example of FIG. 2, the assembly 60 is a blade outer air seal assembly for sealing portions of a gas turbine engine. The assembly 60 can alternatively or additionally be adapted for other portions of the engine 20, such as an upstream stage of the compressor section 24 or combustor panels defining portions of a combustion chamber located in the combustor section 26. Although the teachings herein primarily refer to a two-spool gas turbine engine having a fan, other systems can benefit from the teachings herein, such as engines without a fan and other ground based systems.

The assembly 60 is positioned radially outward of a rotor 62 having an array (or row) of airfoils or rotatable blades 64. The blades 64 are rotatable about the engine longitudinal axis A in a gas path GP, such as the core flow path C (FIG. 1). The blades 64 are positioned adjacent to one or more rows of vanes 65 (one shown in FIG. 3 for illustrative purposes). Each vane 65 can be dimensioned to direct flow in the gas path GP towards the blades 64.

The assembly 60 includes one or more gas turbine engine components 66. In the illustrative example of FIG. 2, the components 66 are blade outer air seals (BOAS) or seal arc segments. In the illustrative example of FIG. 2, the assembly 60 includes an array of seal arc segments 66 circumferentially arranged in an annulus around the engine longitudinal axis A and about the blades 64. The seal arc segments 66 are mounted to at least one support 68, which can be continuous or can be segmented as a plurality of supports (illustrated by dashed lines in FIG. 2). The support 68 is mounted or attached to an engine case 70 through one or more connections 69. The engine case 70 is arranged about and extends along the engine axis A. In other examples, the seal arc segments 66 are directly attached to the engine case 70. The engine case 70 can be mounted or attached to, or form a portion of, the engine static structure 36 (see also FIG. 1).

Each seal arc segment 66 can be formed of a material having a high temperature capability. Example high temperature materials include metallic alloys and ceramic-based materials, such as a monolithic ceramic or a ceramic matrix composite (CMC) material. An example of a high temperature metallic alloy is a nickel-based alloy. Monolithic ceramics include, but are not limited to, silicon carbide (SiC) or silicon nitride ($Si_3N_4$). In other examples, each seal arc segment 66 is formed of high-toughness material such as, but not limited to, single crystal metallic alloys.

The seal arc segments 66 are positioned in close radial proximity to tips 64T of the blades 64 to reduce the amount of gas flow that escapes around the blades 64 and through a clearance gap G. The engine 20 can include an active or passive clearance control system to adjust the clearance gap G to a desired dimension during one or more operating conditions of the engine 20. The clearance gap G may also vary during operation of the engine 20, such as between a non-operating, cold state condition, and an operating condition such as a cruise and/or takeoff condition of the engine 20.

Figure 3:
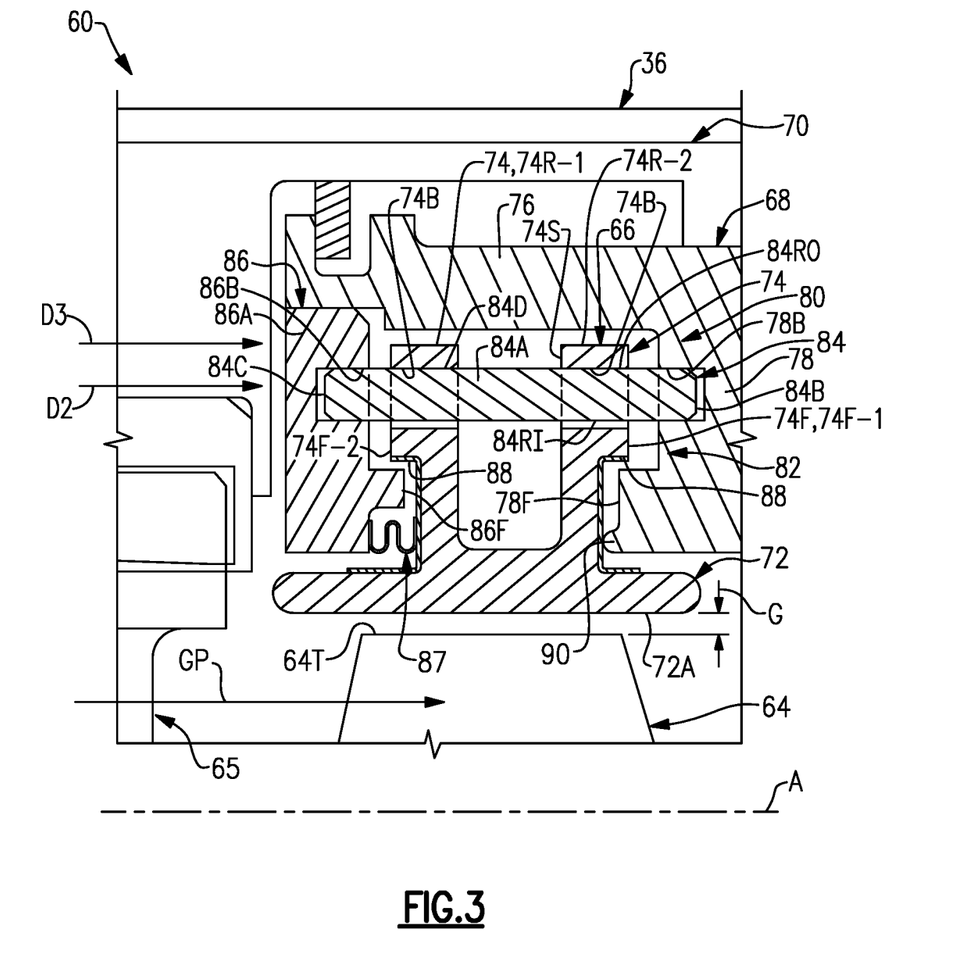
FIG. 3 illustrates a section view of the seal assembly taken along line 3-3 of FIG. 2 including a representative one of the seal arc segments in a first installed position.
Figure 4:
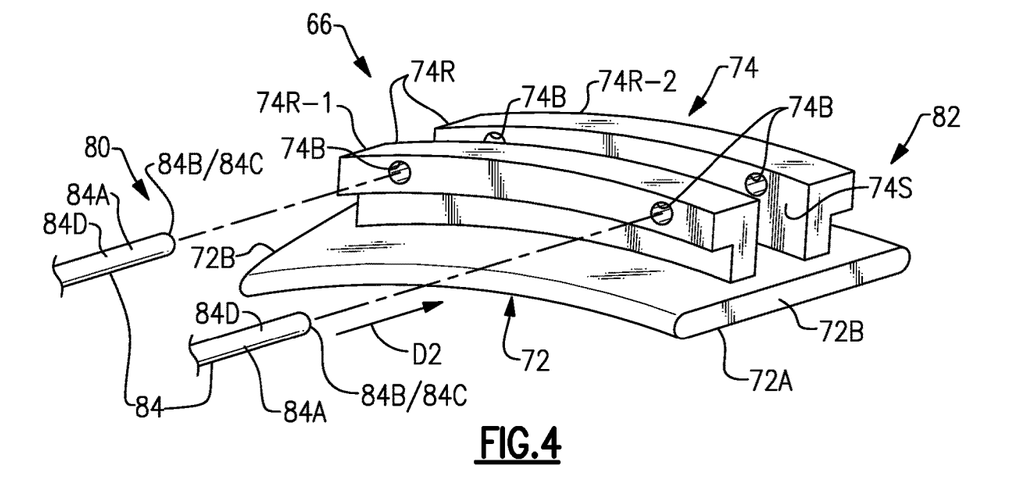
FIG. 4 illustrates a perspective view of the seal arc segment of FIG. 3.

Referring to FIG. 3, with continued reference to FIG. 2, an axial cross section view of the assembly 60 is shown. FIG. 4 illustrates a perspective view of an example seal arc segment 66. Each seal arc segment 66 includes a sealing portion 72 and a first interface portion 74. The sealing portion 72 includes a generally arcuate sealing surface (or face) 72A extending between circumferential mate faces 72B, as illustrated by FIG. 4 (see also FIG. 2). The sealing surface 72A is dimensioned to bound portions of the gas path GP, such as the core flow path C of FIG. 1. The sealing portion 72 and first interface portion 74 can be made of any of the materials disclosed herein, including a ceramic-based material.

The first interface portion 74 of the seal arc segment 66 includes a pair of rails 74R (indicated at 74R-1, 74R-2) extending radially outwardly from the sealing portion 72. An elongated slot or backside cavity 74S extends between the rails 74R. In examples, cooling airflow is communicated to the backside cavity 74S to cool adjacent portions of the seal arc segment 66.

The first interface portion 74 can include a pair of interface flanges 74F (indicated at 74F-1, 74F-2) extending outwardly from the respective rails 74R-1, 74R-2 of the first interface portion 74. The interface flanges 74F and rails 74R can be made of any of the materials disclosed herein, including a ceramic-based material.

The support 68 includes a mounting portion 76 and a second interface portion 78, which can be made of a metallic material. The mounting portion 76 is attachable to the engine static structure 36 directly or through the engine case 70.

The assembly 60 includes a first (e.g., primary) retention feature 80 and a second (e.g., secondary) retention feature 82 that mount the seal arc segments 66 to the support 68 during engine operation. One of the first and second retention features 80, 82 is dimensioned to carry the seal arc segment 66 in response to release of another one of the first and second retention features 80, 82. For the purposes of this disclosure, the term "primary" retention feature refers to an arrangement that at least initially bears a load of the seal arc segment in an installed position, and the term "secondary" retention feature refers to an arrangement that does not bear any load or bears substantially less of the load of the seal arc segment when the load is borne by the primary retention feature in the installed position. Although the first and second retention features 80, 82 are primarily referred to as primary and secondary retention features, respectively, in the example of FIGS. 3-5, in other examples the first retention feature 80 serves as the secondary retention feature, and the second retention feature 82 serves as the primary retention feature. The retention features 80, 82 are dimensioned to establish and maintain a set of predetermined distances between the sealing surface 72A of the seal arc segments 66 and the blade tips 64T across the clearance gap GP. The first and second retention features 80, 82 can be dimensioned with respect to expected manufacturing and design tolerances and expected thermal distortions of the components of the assembly 60 during engine operation.

In some scenarios, a position of the first interface portion 74 changes relative to the second interface portion 78 due to a release of the first retention feature 80 when the seal arc segment 66 is situated in the first installed position. Such changes may occur due to shearing of a retention pin 84, or delamination or sheering of the CMC material of the seal arc segment 66 due to stress concentrations when the seal arc segment 66 is situated in the first installed position, for example. The first and second retention features 80, 82 cooperate to maintain a clearance between the seal arc segments 66 and the adjacent blades 64.

Various first and second retention features 80, 82 can be utilized. The first and second retention features 80, 82 can be the same or can differ. The first retention feature 80 can be arranged to releasably secure the first interface portion 74 to the support 68 in a first installed position of the seal arc segment 66. Example retention features include fasteners such as clips, pins, bolts and rivets, as well as other components that mechanically join objects together such as a length of wire. In the illustrative example of FIGS. 3-4, the first retention feature 80 includes one or more retention pins (or members) 84 dimensioned to engage the support 68 and the first interface portion 74 of a respective one of the seal arc segments 66 such that each of the seal arc segments 66 is carried by one or more of the retention pins 84 in the first installed position of the seal arc segment 66. The seal arc segment 66, support 68 and retention pins 84 are separate and distinct components.

Each retention pin 84 includes an elongated main body 84A extending between opposed first and second end portions 84B, 84C. The first interface portion 74 includes one or more interface bores 74B extending through a respective rail 74R. Each interface bore 74B of the rail 74R-1 is partially or completely radially aligned with a respective interface bore 74B of the rail 74R-2. Each interface bore 74B has a diameter that is greater than a diameter of a respective one of the retention pins 84. The second interface portion 78 includes one or more support bores 78B (one shown in FIG. 3 for illustrative purposes). The interface and support bores 74B, 78B are dimensioned to at least partially receive a respective retention pin 84 to establish the first installed position of the seal arc segment 66.

The assembly 60 includes a seal plate 86 attached or releasably secured to the support 68. Various techniques can be utilized to secure the seal plate 86 to the support 68, such as one or more fasteners. The seal plate 86 has a generally arcuate geometry and extends about the engine longitudinal axis A (shown in dashed lines in FIG. 2 for illustrative purposes). The seal plate 86 includes a plate flange 86F extending outwardly from a plate body 86A. The seal plate 86 includes one or more plate bores 86B (one shown in FIG. 3 for illustrative purposes) dimensioned to at least partially receive the retention pin 84 to establish the first installed position of the seal arc segment 66.

A seal member 87 is captured between the seal arc segment 66 and seal plate 86. In the illustrative example of FIG. 3, the seal member 87 is a W-seal arranged to oppose flow along an axial gap between the seal arc segment 66 and seal plate 86.

Each of the interface flanges 74F can include a sacrificial member 88 disposed on surfaces of the flange 74F. The sacrificial member 88 can be made of a material that differs from a material of the respective flange 74F. The sacrificial member 88 can be machined or otherwise formed to have a complementary geometry with the respective flange 78F/86F while preserving a construction of the underlying laminate structure. The sacrificial member 88 can be a coating or constructed from one or more sacrificial plies or layers, and is dimensioned to eliminate or otherwise reduce direct contact between surfaces of the interface flange 74F and the respective flange 78F/86F. An example coating includes a silicon metal that is adapted to substantially match a rate of thermal expansion of the seal arc segment 66 to reduce a likelihood of spalling of the laminate structure of the CMC layup.

The support 68 can include at least one face seal 90 dimensioned to engage the first interface portion 74 directly or along the adjacent sacrificial member 88. The face seal 90 is dimensioned to oppose flow along an axial gap between the first interface portion 74 and second interface portion 78 of the support 68.

In the first installed position, each interface bore 74B is partially or completely radially aligned with an adjacent support bore 78B and/or plate bore 86B. Each retention pin 84 is slidably received in, and extends at least partially through, the interface bore 74B of each rail 74R-1, 74R-2 and is received in a respective support bore 78B and plate bore 86B to secure the first interface portion 74 to the support 68 in the first installed position.

The support 68 and seal plate 86 are dimensioned to trap the retention pin(s) 84 in the first installed position. The first end portion 84B of the retention pin 84 is at least partially inserted into the respective support bore 78B, and the second end portion 84C of the retention pin 84 is at least partially inserted into the respective plate bore 86B. Various techniques can be utilized to secure the retention pin 84 to the support 68 and/or seal plate 86, such as press fitting or threadedly attaching the retention pin 84 in the support bore 78B and/or plate bore 86B.

Each interface bore 74B is dimensioned such the rails 74R of the seal arc segment 66 are carried by an outer periphery 84D of the retention pin(s) 84 in the first installed position. The interface bores 74B are dimensioned such that the rails 74R of the first interface portion 74 sit on a radially outer surface 84RO of the retention pin 84 in the first installed position, as illustrated by FIG. 3. The interface bores 74B is dimensioned such that the rails 74R are spaced apart from a radially inner surface 84RI of the retention pin 84 in the first installed position to accommodate differences in thermal expansion of rails 74R, retention pin 84, support 68 and/or support plate 86 during engine operation. In other examples, a diameter of the retention pin 84 is substantially equal to a diameter of the interface bores 74B.

Figure 5:
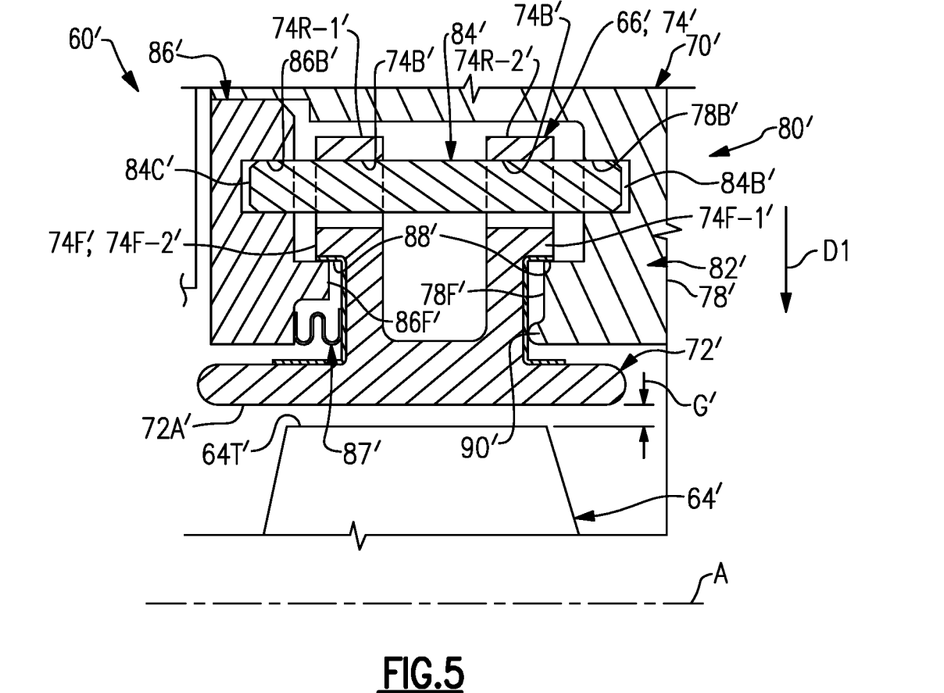
FIG. 5 illustrates a section view of the seal arc segment of FIG. 3 in a second installed position.

The second retention feature 82 is dimensioned to secure the first interface portion 74 of the seal arc segment 66 to the second interface portion 78 of the support 68 in a second installed position of the seal arc segment 66, as illustrated by seal arc segment 66' of FIG. 5. The first installed position of the seal arc segment 66 differs from the second installed position of seal arc segment 66'.

The second retention feature 82 is dimensioned to bound radial movement of the seal arc segment 66 towards the engine longitudinal axis A and secure the seal arc segment 66 in the second installed position in response to a release of the first retention feature 80 when the seal arc segment 66 is in the first installed position. The second retention feature 82 is dimensioned such that a clearance gap G' is maintained between a sealing surface 72A' of the seal arc segment 66' and a blade tip 64T' of the adjacent blade 64'. In examples, the first installed position of the seal arc segment 66 is radially outward of the second installed position of the seal arc segment 66' such that a dimension of the clearance gap G is greater than a dimension of the clearance gap G'.

In the illustrative example of FIG. 3, the support 68 includes a support flange 78F extending outwardly from the second interface portion 78. The interface flanges 74F are at least partially axially aligned with the respective support flange 78F and plate flange 86F relative to the engine longitudinal axis A. The interface flange(s) 74F together with the support flange 78F and/or plate flange 86F cooperate to establish the second retention feature 82. The support flange 78F and/or plate flange 86F are dimensioned to carry a load of the seal arc segment 66 in the second installed position, but not in the first installed position, in response to a release of the first retention feature 80 when the seal arc segment 66 is situated in the first installed position. The second retention feature 82 can be dimensioned to carry at least a portion or substantially all of the load of the seal arc segment 66.

In the illustrative examples of FIG. 5, the interface flange(s) 74F' are dimensioned to sit on the support flange 78F' and plate flange 86F' in the second installed position to limit radially inward movement of the seal arc segment 66' towards the engine longitudinal axis A. Each sacrificial member 88' is dimensioned to engage the support flange 78F' and/or plate flange 86F' in the second installed position. In other examples, the sacrificial member 88' is disposed on the support flange 78F' and/or plate flange 86F' or is omitted such that the interface flanges 74F' directly contacts the support flange 78F'.

The assembly 60 can be assembled as follows. The first interface portion 74 of the seal arc segment 66 is positioned relative to the second interface portion 78 of the support 68 such that engagement of the first and second interface portions 74, 78 establishes the second installed position of the seal arc segment 66 in which the seal arc segment 66 is carried by the support 68. At least one retention pin 84 is moved in a direction D2 (FIGS. 3-4) and is inserted in the interface bore(s) 74B and in the support bore 78B such that engagement of the retention pin 84 with surfaces of the interface bore(s) 74B and surfaces of the support bore 78B establishes the first installed position in which the seal arc segment 66 is carried by the retention pin 84. Thereafter, the seal plate 86 is secured to the support 68 to trap the retention pins 84 and to establish the first installed position. The retention pin 84 is received in a respective plate bore 86F.

During operation, each seal arc segment 66 is carried by the first retention feature 80 in the first installed position to seal portions of the gas path GP. Upon release of the first retention feature 80, the seal arc segment 66 moves in the radially inward direction D1 (FIG. 5) towards the engine longitudinal axis A from the first installed position to the second installed position. The second retention feature 82 captures the seal arc segment in the second installed position to reduce a likelihood of contact between the seal arc segment 66 and adjacent blades 64 during operation. The second retention feature 82 can be adapted to redistribute pressure loads carried by the first retention feature 80 over additional surface area due to engagement of the first and second retention features 80, 82 in the second installed position of the seal arc segment 66.

Figure 6:
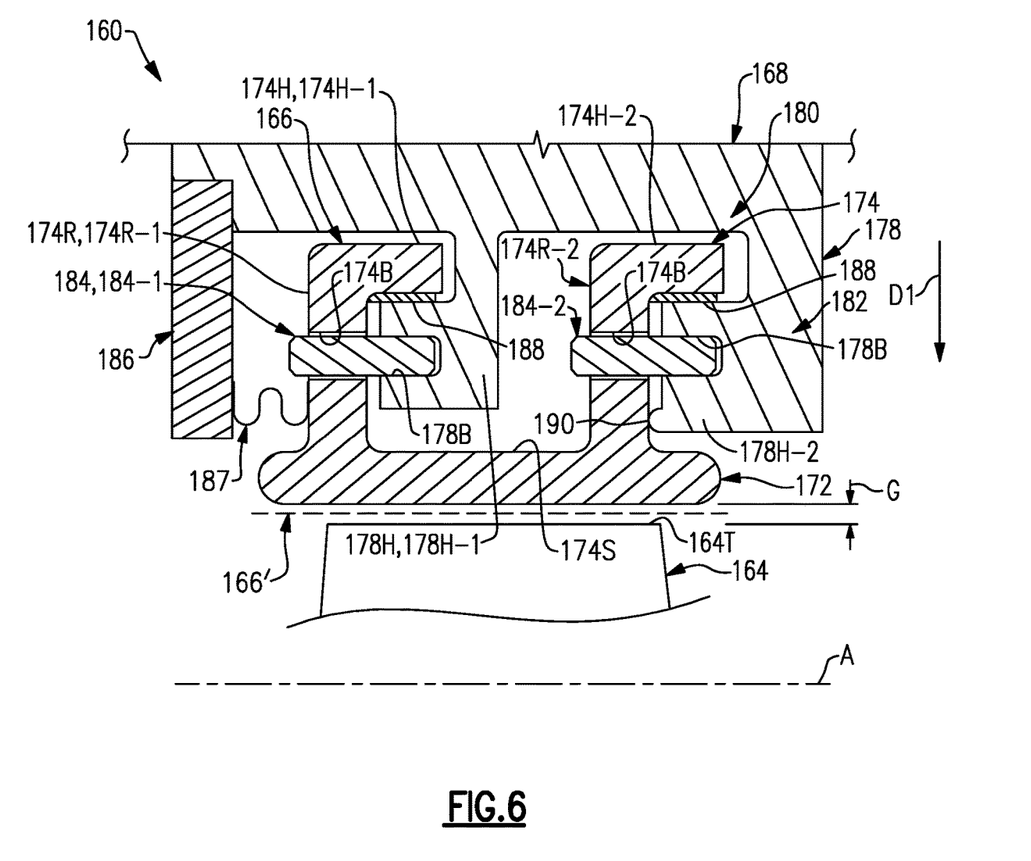
FIG. 6 illustrates a section view of a seal assembly according to another example.

FIG. 6 illustrates an assembly 160 for a gas turbine engine according to another example. In this disclosure, like reference numerals designate like elements where appropriate and reference numerals with the addition of one-hundred or multiples thereof designate modified elements that are understood to incorporate the same features and benefits of the corresponding original elements. The assembly 160 includes at least one seal arc segment 166, at least one support 168 and a seal plate 186. The seal arc segment 166 and support 168 cooperate to establish a first retention feature 180 and a second retention feature 182.

The seal arc segment 166 includes a first interface portion 174 extending outwardly from a sealing portion 172. The first interface portion 174 includes a pair of rails 174R (indicated at 174R-1, 174R-2). A pair of retention hooks 174H (indicated at 174H-1, 174H-2) extend transversely from the respective rails 174R-1, 174R-2.

The support 168 includes a second interface portion 178 having a pair of retention hooks 178H (indicated at 178H-1, 178H-2) dimensioned to mate with the retention hooks 174H-1, 174H-2. A sacrificial member 188 can be disposed on surfaces of each retention hook 174H and can be dimensioned to engage surfaces of the adjacent retention rail 178H.

The retention hooks 174H, 178H cooperate to establish the first retention feature 180. The retention hooks 174H of the seal arc segment 166 are dimensioned to sit on and be carried by the retention hooks 178H of the support 168 in a first (e.g., primary) installed position of the seal arc segment 166.

The second retention feature 182 includes one or more retentions pin 184 that engages the second interface portion 178 to secure the seal arc segment 166 to the support 168. In the illustrative example of FIG. 6, the second retention feature 182 a pair of retention pins 184 (indicated at 184-1, 184-2) that mount the seal arc segment 166 to the support 168. Each retention pin 184 is slidably received in, and extends at least partially through, an interface bore 174B of the respective rail 174R and is inserted in a respective support bore 178B to secure the first interface portion 174 to the support 168 in a second (e.g., secondary) installed position of the seal arc segment 166. Each interface bore 174B is dimensioned such that the rails 174R sit on and are carried by the retention pins 184 in the second installed position, but not in the first installed position, in response to movement of the seal arc segment 166 in a radially inward (or first) direction D1 towards the engine longitudinal axis A from the first installed position to the second installed position. The second installed position of the seal arc segment 166 is illustrated by dashed line 166' in FIG. 6.

Figure 7A:
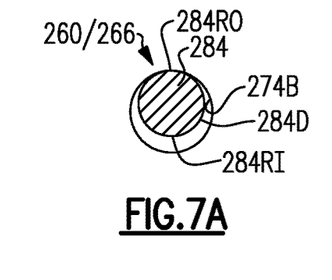
FIG. 7A illustrates an example retention pin having a circular profile.
Figure 7B:
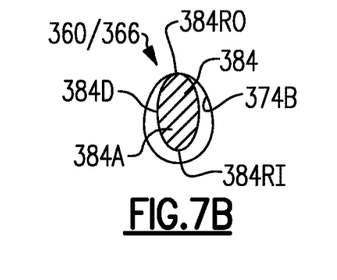
FIG. 7B illustrates an example retention pin having an elliptical profile.
Figure 7C:
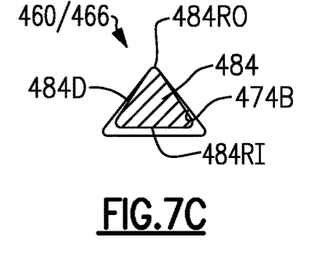
FIG. 7C illustrates an example retention pin having a triangular profile.

The retention pins can have various profiles, such as a circular cross section as illustrated by retention pin 284 of FIG. 7A, a non-circular elliptical cross section as illustrated by retention pin 384 of FIG. 7B, or a generally triangular cross section as illustrated by retention pin 484 of FIG. 7C. Other example retention pin profiles include a rectangular or complex cross section. The interface bores disclosed herein can be dimensioned to accept retention pins having different diameters or widths to set a predefined radial position of the respective seal arc segment relative to the engine longitudinal axis A. In other examples, a geometry of the interface bores differ from a geometry of the retention pins. For example, the retention pin 484 can be utilized in one of the interface bores 274B/374B. As another example, the retention pin 284 can be utilized in one of the interface bores 374B/474B.

Figure 8:
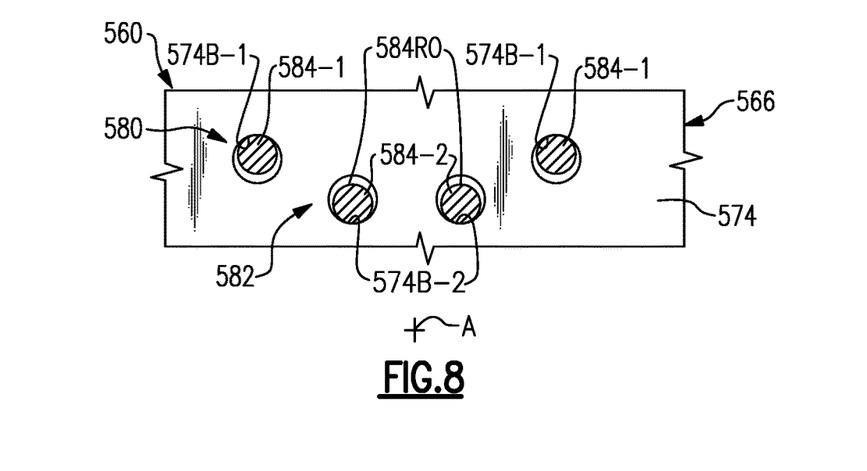
FIG. 8 illustrates a seal assembly according to another example.

FIG. 8 illustrates an assembly 560 according to another example. A first retention feature 580 of a gas turbine engine component or seal arc segment 566 is established by a first set of retention pins 584-1, and a second retention feature 582 is established by a second set of retention pins 584-2. The first set of retention pins 584-1 are received in a first set of interface bores 574B-1 of first interface portion 574 to establish a first installed position of the seal arc segment 566. The second set of retention pins 584-2 are received in a second set of interface bores 574B-2 of the of first interface portion 574 to establish a second installed position of the seal arc segment 566. The first set of retention pins 584-1 are dimensioned to carry a load of the seal arc segment 566 in the first installed position. The second set of retention pins 584-2 are dimensioned to carry a load of the seal arc segment 566 in the second installed position, but not in the first installed position.

The first set of interface bores 574B-1 are radially offset from the second set of interface bores 574-2. The second set of interface bores 574-2 are dimensioned such that a radially outer surface 584RO of each retention pin 584-2 is spaced apart from the respective interface bore 574B-2 in the first installed position, but not the second installed position of the seal arc segment 566.

Figure 9:
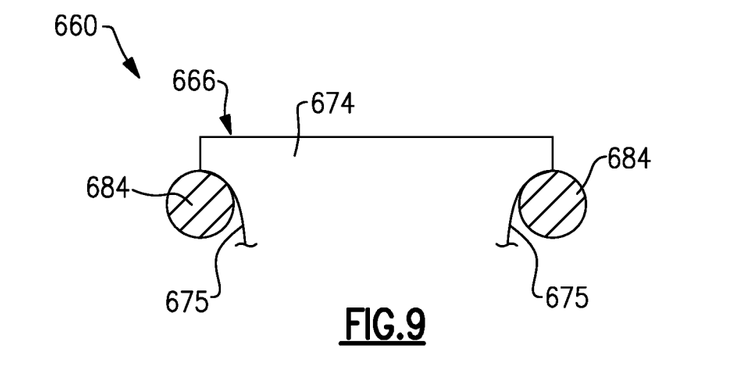
FIG. 9 illustrates a seal assembly according to yet another example.

FIG. 9 illustrates an assembly 660 according to yet another example. A set of retention pins 684 are dimensioned to abut circumferentially opposed shoulders 675 of seal arc segment 666. The shoulders 675 can have a generally dovetail geometry. The shoulders 675 can be utilized to establish the first or second installed position of the seal arc segment 666.

It should be understood that relative positional terms such as "forward," "aft," "upper," "lower," "above," "below," and the like are with reference to the normal operational attitude of the vehicle and should not be considered otherwise limiting.

Although the different examples have the specific components shown in the illustrations, embodiments of this disclosure are not limited to those particular combinations. It is possible to use some of the components or features from one of the examples in combination with features or components from another one of the examples.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An assembly for a gas turbine engine comprising:
a gas turbine engine component including a first interface portion, the first interface portion including integral first and second rails and first and second retention hooks, each of the first and second retention hooks extending transversely in a first direction from a respective one of the first and second rails relative to an assembly axis;
a support including a mounting portion and a second interface portion, the mounting portion attachable to an engine static structure, and the second interface portion including first and second support hooks;
a first retention feature that secures the first interface portion to the second interface portion in a first installed position of the gas turbine engine component, the gas turbine engine component moveable in the first direction to mount the first and second retention hooks to the first and second support hooks such that the first retention feature is established by the first and second support hooks being axially aligning with respective ones of the first and second retention hooks relative to the assembly axis;
a second retention feature that secures the first interface portion to the support in a second installed position of the gas turbine engine component; and
wherein the first installed position differs from the second installed position, and the second retention feature is dimensioned to carry the gas turbine engine component in response to release of the first retention feature.

2. The assembly as recited in claim 1, wherein the first and second retention hooks sit on a respective one of the first and second support hooks in the first installed position.

3. The assembly as recited in claim 2, further comprising:
a sacrificial member in abutment between the first retention hook and the first support hook.

4. The assembly as recited in claim 1, wherein the gas turbine engine component is a seal arc segment including a sealing portion dimensioned to bound a gas path surface.

5. The assembly as recited in claim 4, wherein the second retention feature includes at least one retention pin that engages the second interface portion to secure the seal arc segment to the support in the second installed position.

6. The assembly as recited in claim 5, wherein the first and second rails each include an interface bore, and the at least one retention pin includes a plurality of retention pins each slidably received through the interface bore of a respective one of the first and second rails.

7. The assembly as recited in claim 6, wherein the first and second support hooks each include a support bore dimensioned to at least partially receive a respective one of the retention pins.

8. The assembly as recited in claim 7, wherein the interface bore and the support bore are dimensioned such that the first and second rails both sit on a radially outer periphery of a respective one of retention pins relative to the assembly axis in the second installed position, but do not sit on the radially outer periphery in the first installed position.

9. The assembly as recited in claim 4, wherein the sealing portion and the first interface portion of the seal arc segment comprise a ceramic material.

10. The assembly as recited in claim 4, further comprising:
a seal plate attachable to the support; and
a seal member captured between one of the first and second rails of the seal arc segment and the seal plate.

11. A gas turbine engine comprising:
- an engine case extending along an engine longitudinal axis;
- an array of blades rotatable about the engine longitudinal axis in a core flow path; and
- a plurality of seal assemblies arranged circumferentially about the array of blades, each of the seal assemblies comprising:
    - a blade outer air seal (BOAS) including a sealing portion and a first interface portion, the sealing portion dimensioned to bound the core flow path, the first interface portion including integral first and second rails and first and second retention hooks, and each of the first and second retention hooks extending transversely in a first direction from a respective one of the first and second rails relative to the engine longitudinal axis;
    - a support attached to the engine case, the support including a second interface portion including first and second support hooks;
    - a first retention feature dimensioned to bound radial movement of the BOAS towards the engine longitudinal axis in a first installed position of the BOAS, the first retention feature established by the first and second support hooks axially aligning with respective ones of the first and second retention hooks relative to the engine longitudinal axis;
    - a second retention feature dimensioned to engage the support and the first interface portion of the BOAS to bound radial movement of the BOAS towards the engine longitudinal axis in a second installed position; and
    - wherein a clearance gap between the BOAS and the blades is greater in the first installed position than in the second installed position.

12. The gas turbine engine as recited in claim 11, wherein the second retention feature includes at least one retention pin that engages the second interface portion to secure the BOAS to the support in the second installed position.

13. The gas turbine engine as recited in claim 12, wherein the at least one retention pin includes a non-circular cross section.

14. The gas turbine engine as recited in claim 12, wherein:
- the first and second rails each include an interface bore;
- the first and second support hooks each include a support bore; and
- the at least one retention pin includes a plurality of retention pins each slidably received through the interface bore of a respective one of the first and second rails and at least partially received in the support bore of a respective one of the first and second support hooks to establish the second installed position.

15. The gas turbine engine as recited in claim 14, further comprising:
- a first sacrificial member in abutment between the first retention hook and the first support hook;
- a second sacrificial member in abutment between the second retention hook and the second support hook; and
- wherein each sacrificial member is dimensioned to establish the first installed position.

16. The gas turbine engine as recited in claim 14, wherein the interface bore and the support bore are dimensioned such that the first and second rails both sit on a radially outer periphery of respective ones of the retention pins relative to the engine longitudinal axis in the second installed position, but do not sit on the radially outer periphery in the first installed position.

17. A method of sealing for a gas turbine engine comprising:
- positioning a seal arc segment relative to a support, including positioning a first interface portion of the seal arc segment relative to a second interface portion of the support such that engagement of the first and second interface portions establishes a first installed position of the seal arc segment in which the seal arc segment is carried by the support, wherein:
    - the first interface portion includes integral first and second rails, first and second retention hooks, and a first interface bore, and each of the first and second retention hooks extends transversely in a first direction from a respective one of the first and second rails;
    - the second interface portion includes first and second support hooks and a first support bore; and
    - the positioning step includes axially aligning the first and second support hooks with respective ones of the first and second retention hooks relative to an assembly axis to mount the seal arc segment to the support;
- inserting a first retention pin in the first interface bore and the first support bore such that engagement of the first retention pin with surfaces of the first interface bore and surfaces of the first support bore establishes a second installed position of the seal arc segment such that the seal arc segment is carried by the first retention pin; and
- wherein the second installed position is established in response to release of the seal arc segment from the first installed position.

18. The method as recited in claim 17, wherein the first rail comprises the first interface bore, the second rail includes a second interface bore, the first support hook comprises the first support bore, the second support hook includes a second support bore, and further comprising:
- inserting a second retention pin in the second interface bore and the second support bore such that engagement of the second retention pin with surfaces of the second interface bore and surfaces of the second support bore establishes the second installed position such that seal arc segment is carried by the first and second retention pins.

19. The method as recited in claim 18, wherein the first and second interface bores and the first and second support bores are dimensioned such that the first and second rails both sit on a radially outer periphery of respective ones of the first and second retention pins relative to the assembly axis in the second installed position, but do not sit on the radially outer periphery in the first installed position.

20. The method as recited in claim 17, further comprising:
- positioning a first sacrificial member between the first retention hook and the first support hook and positioning a second sacrificial member between the second retention hook and the second support hook to establish the first installed position.

* * * * *